United States Patent [19]

Scholz et al.

[11] Patent Number: 5,709,734
[45] Date of Patent: Jan. 20, 1998

[54] METHOD FOR DISPOSING OF OZONE-DEGRADING AND CLIMATICALLY ACTIVE HALOGENATED COMPOUNDS

[75] Inventors: Christoph Scholz, Waakirchen; Walter Holzinger, Deisenhofen; Robert Schloegl, Berlin, all of Germany

[73] Assignee: CS-GmbH Halbleiter- und Solartechnologie, Ismaning, Germany

[21] Appl. No.: 387,417

[22] Filed: Feb. 10, 1995

[30] Foreign Application Priority Data

Feb. 11, 1994 [DE] Germany ............... 44 04 329.5

[51] Int. Cl.$^6$ ............................................. B01D 53/02
[52] U.S. Cl. ............................................. 95/131; 588/206
[58] Field of Search .................. 502/84; 570/229; 423/659, 240 R, 240 S; 588/206; 95/131, 132

[56] References Cited

U.S. PATENT DOCUMENTS

| | | | |
|---|---|---|---|
| 3,989,807 | 11/1976 | Johnston | 423/502 |
| 4,751,212 | 6/1988 | Flockenhaus et al. | 502/338 |
| 4,774,213 | 9/1988 | Schneider et al. | 502/81 |
| 4,997,632 | 3/1991 | Rodewald | 423/240 |
| 5,114,692 | 5/1992 | Berty | 423/245.3 |
| 5,118,492 | 6/1992 | Okazaki et al. | 423/659 |
| 5,151,116 | 9/1992 | Scholz et al. | 55/387 |
| 5,276,249 | 1/1994 | Greene et al. | 588/206 |
| 5,298,473 | 3/1994 | Pinnavaia et al. | 502/84 |

FOREIGN PATENT DOCUMENTS

| | | |
|---|---|---|
| 2 032 036 | 1/1972 | Germany . |
| 2 221 031 | 11/1973 | Germany . |
| 4102969 C1 | 8/1982 | Germany . |
| 3728812 C2 | 10/1988 | Germany . |
| 3825905 C2 | 2/1990 | Germany . |

OTHER PUBLICATIONS

Hooker et al., Environ. Sci. Technol., vol. 28, No. 7, pp. 1243–1247, 1994.
Hackh's Chemical Dictionary, 4th ed., New York:Mc Graw Hill Co., p. 283, 1969.

Primary Examiner—Deborah Jones
Assistant Examiner—Amy M. Harding
Attorney, Agent, or Firm—Flynn, Thiel, Boutell & Tanis, P.C.

[57] ABSTRACT

To dispose of halogenated hydrocarbons one uses a solid sorbent containing an iron oxide and/or iron oxyhydroxide.

9 Claims, 1 Drawing Sheet

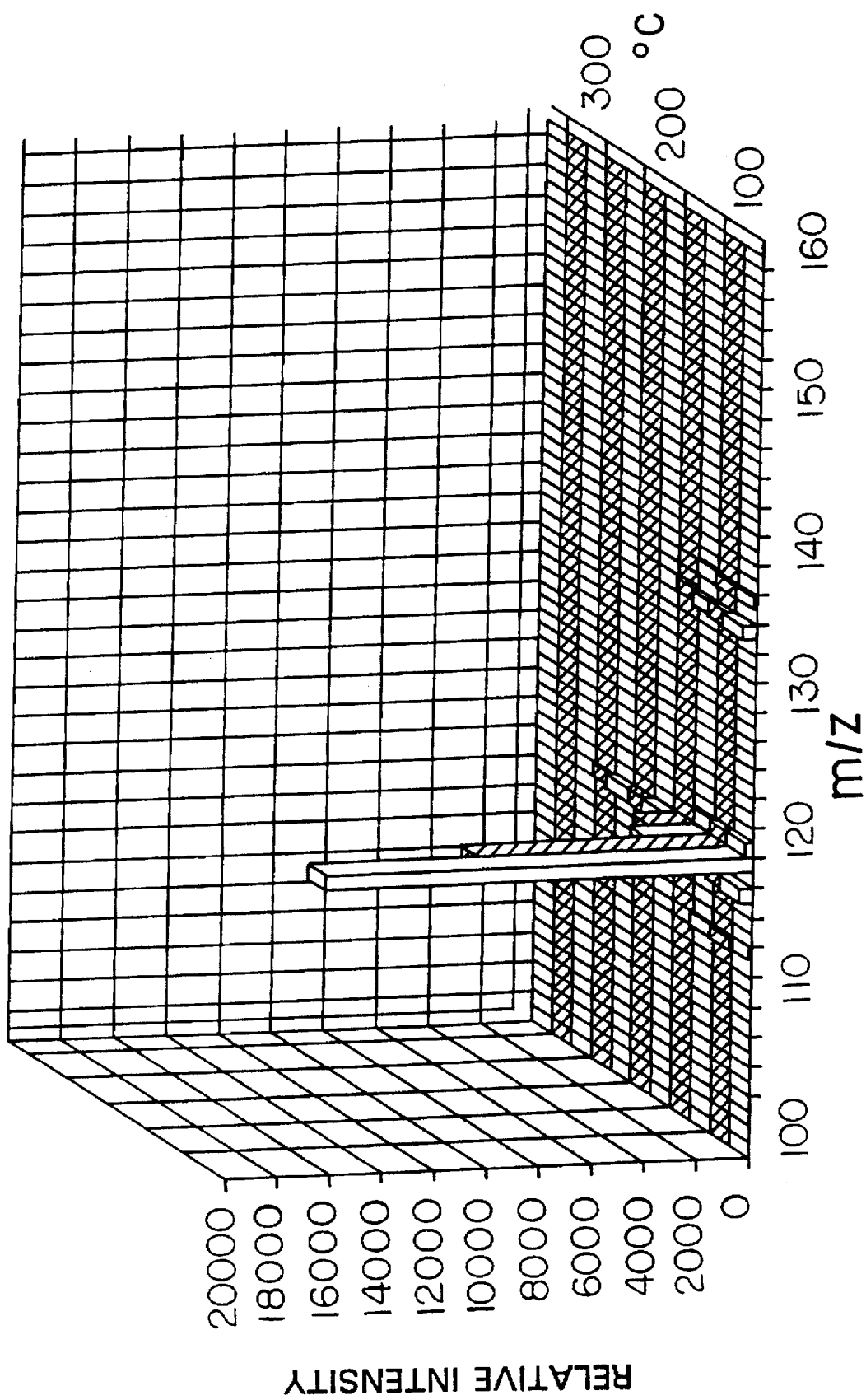

5,709,734

METHOD FOR DISPOSING OF OZONE-DEGRADING AND CLIMATICALLY ACTIVE HALOGENATED COMPOUNDS

FIELD OF THE INVENTION

The present invention relates to a method for disposing of ozone-degrading and/or climatically active halogenated compounds, in particular chlorofluorohydrocarbons (CFCs), fluorocarbons (FCs) and chlorocarbons (CCs).

BACKGROUND OF THE INVENTION

CFCs, FCs and CCs have been used to a great extent for over fifty years as foaming agents, refrigerants, blowing and parting agents, fire-extinguishing agents, solvents and cleaning agents.

After the suspicion was confirmed that CFCs, FCs and CCs are largely responsible for the depletion of the ozone layer in the stratosphere and greatly increase the greenhouse effect, a 50% reduction of the production and use of certain CFCs by 1999 was agreed upon in the 1987 Montreal Protocol. In the subsequent London accord in 1990 this agreement was strengthened to call for a 100% ban on all CFCs, FCs and CCs by the year 2000.

According to estimates, more than 2 million tons of CFCs are currently in circulation worldwide in insulating foams, refrigerating plants and in the form of bunkered stocks. To dispose of these stocks high-temperature cleavage in an oxyhydrogen flame is employed. Thus, according to the source "Recycling of CFCs" in "Uhde Engineering News" 11/1992, CFCs are decomposed in an oxyhydrogen flame at a temperature of about 2000° C. into hydrofluoric acid, carbon dioxide, hydrochloric acid and chlorine. This high combustion temperature is imperative for quantitative decomposition. For example if air is used instead of oxygen or methane instead of hydrogen no quantitative decomposition is possible. Apart from this, the use of air or methane would lead to an accordingly high discharge of $NO_x$ or $CO_2$. With the aid of subsequent film reactors 50% hydrofluoric acid and 30% hydrochloric acid are obtained from the products of combustion by the known method. In a last gas washer step traces of acids and chlorine are bound. The emitted waste gas contains $CO_2$, oxygen and $NO_x$.

Despite the high efficiency of approximately 100% and the production of basically reusable cleavage products such as hydrofluoric acid and hydrochloric acid, the combustion methods have immanent disadvantages. The energy required in particular for producing the hydrogen and oxygen used for combustion is considerable, especially since this high energy requirement involves an accordingly high utilization of primary energy and thus an accordingly high $CO_2$ equivalent when fossil energy carriers are used.

Also, the demand for hydrofluoric acid, which is formed in this method, is limited and the demand for hydrochloric acid is likewise declining due to the drop in the production of chlorine-containing products. A major part of the hydrofluoric acid and hydrochloric acid must therefore be bound and then disposed of. Furthermore, since the combustion methods require high combustion temperatures and stable combustion conditions for a quantitative reaction they can only be run economically in continuous operation, i.e. only with high throughputs of several thousand tons a year. The disposal of small amounts of CFCs, e.g. CFC coolants from refrigerators, would therefore require an extensive CFC collecting system to be built up to permit continuous operation of such a combustion plant.

Halogenated hydrocarbons, in particular CFCs, FCs and CCs, have high ODP (ozone depletion potential). The extremely long lifetime of these substances causes a high buildup in the atmosphere, which intensifies the greenhouse effect in view of the climatic action of these substances (IR absorptions in the atmospheric window). Along with their ODP these substances thus also have GWP (greenhouse warming potential). Perfluorinated nitrogen and sulfur, i.e. nitrogen trifluoride ($NF_3$) and sulfur hexafluoride ($SF_6$), are also characterized by high GWP.

THE DRAWING

The FIGURE shows a three-dimensional representation of the composition of reactor effluents obtained with the use of a mass spectrometer.

BRIEF SUMMARY OF THE INVENTION

The invention is therefore based on the problem of providing a method for disposing economically of even small amounts of halogenated compounds that are ozone-degrading and/or climatically active.

The invention provides a method for disposing of ozone-degrading and/or climatically active (GWP) halogenated compounds selected from the group consisting of ozone-degrading halogenated compounds, climatically active halogenated compounds and mixtures thereof, characterized in that the halogenated compounds are passed in the form of vapor through a solid sorbent heated to at least 100° C. and containing an iron oxide, iron oxyhydroxide, iron hydroxy salt, iron oxyhydroxy salt and mixtures thereof.

The proportion of iron oxide, iron oxyhydroxide, iron hydroxy salt or iron oxyhydroxy salt can constitute only 1% by weight of the sorbent and be up to 80% by weight, but the content of these iron compounds is preferably 3 to 60% by weight. The balance is formed by a mineral carrier.

A suitable iron oxyhydroxide is in particular goethite (α-FeOOH). Suitable iron oxides are ferrihydrite ($Fe_2O_3 \pm 2FeOOH.2,6H_2O$), maghemite ($\gamma$-$Fe_2O_3$), magnetite ($Fe_3O_4$) and hematite ($\alpha$-$Fe_2O_3$). A mixture of goethite and ferrihydrite, optionally with hematite and/or maghemite, has proven particularly suitable.

However other iron oxyhydroxides can also be used, such as acaganeit, lepidocrite or feroxyhyte. Iron oxides or iron oxyhydroxides with a proportion of $Fe^{2+}$ are preferred since their reducing properties lead to particularly high sorbability.

The sorbent can also contain iron hydroxy salts such as iron hydroxy chloride, sulfate and/or carbonate, and iron oxyhydroxy salts such as iron oxyhydroxy sulfate.

The abovementioned iron oxides or iron oxyhydroxides can be doped with metals from groups IIIa, IIb, IVb, VIb, VIIb and VIIIb of the periodic system, in, particular with aluminum, manganese, chromium, nickel, titanium, cobalt, copper and/or zinc. In the iron oxide or iron oxyhydride the iron can also be replaced partly by ion exchange by a different metal from the abovementioned groups of the periodic system. For example in goethite the iron can be replaced by aluminum, manganese and/or chromium.

The solid sorbent is preferably present as a solid bed. It can be held in a container provided with a sealable inlet port at one end and a sealable outlet port at the other end. The container can be constructed for example according to DE 41 02 969 C1.

The sorbent preferably contains a phyllosilicate, in a proportion of at least 10% by weight, preferably at least 50% by weight. The phyllosilicate is not only a mineral carrier for the iron compound but participates actively in the sorption, thus leading to a substantial increase in the sorbability of the sorbent.

Phyllosilicates used according to the inventive method can be in particular minerals of the Montmorin group, i.e. especially bentonites and closely related clay materials such as montmorillonite, nontronite, saponite or vermiculite, as well as talc and minerals of the mica group such as muscovite, biotite, illite, phlogopite, lepidolite, margarite, paragonite or chloritoid. However kaolins, such as kaolin or chamosite, and serpentine minerals, such as serpentine, meerschaum, garnierite or halloysite, can also be used.

The inventive method is generally conducted in a temperature range between 100° and 500° C., in particular between 150° and 450° C. The inventive method is preferably conducted at atmospheric pressure. However it can also be conducted with underpressure or with a pressure of up to 20 bars for example.

The sorbability of the solid sorbent with respect to CFC is generally increased and/or the temperature necessary for sorption can generally be lowered if the natural phyllosilicates are modified, for example by an acid treatment or by ion exchange. For example the CFC sorbability of bentonites can be increased by ion exchange with a metal from group Ia, IIa, IIIa, Ib, IIb, VIb, VIIb or VIIIb of the periodic system or with quaternary ammonium salts. Sorbability can also be generally increased by intercalating, i.e. inserting, cations of metals from groups Ia, IIa, IIIa, Ib, IIb, VIb, VIIb and VIIIb of the periodic system between the layer lattice planes of the phyllosilicates, i.e. forming so-called "pillared clays". Suitable metal cations are in particular hydroxy-Al cations, hydroxy-Fe(III) cations and mixtures of hydroxy-Fe(III) cations and hydroxy-Al cations, as well as phenanthroline-Fe(II) cations and trinuclear Fe(II)-acetato cations.

An increase in the sorbability of the sorbent with respect to the halogenated compounds to be disposed of, or a reduction of the temperature necessary for sorption, is thus obtained in the inventive method by the sorbent containing a phyllosilicate along with the iron oxide, iron oxyhydroxide, iron hydroxy salt or iron oxyhydroxy salt. One can use natural phyllosilicates that have a high iron oxide or iron oxyhydroxide content, or the iron oxide or iron oxyhydroxide can be formed subsequently. Also, the iron oxide or iron oxyhydroxide, including the salts thereof, can be present in a mixture with the phyllosilicate. It can also be incorporated in the phyllosilicate e.g. by intercalation.

Along with the phyllosilicate and the abovementioned iron compounds the sorbent can also contain a carbonate and/or sulfate of metals from group IIa of the periodic system, in an amount of up to 30% by weight, preferably up to 15% by weight. The carbonate can be for example calcium or magnesium carbonate or dolomite ($CaMg(CO_3)_2$), the sulfate for example calcium sulfate.

The halogenated compounds to be disposed of are fed to the solid sorbent as vapor, optionally with a carrier gas such as nitrogen, at a space velocity of preferably at most 1000 $h^{-1}$ (total volumetric rate of flow [1/h]/catalyst volume [1]).

In the inventive method the halogenated compounds to be disposed of are bound quantitatively and irreversibly by the solid sorbent. No decomposition products or reaction products arise which are not bound, apart from water. No decomposition products or reaction products are emitted even when the sorbent is saturated. When the sorbent is saturated the emerging halogenated compound can therefore for example be bound with the sorbent by a subsequent solid bed, for example a further container filled with the solid sorbent according to DE 41 02 969 C1.

Since the inventive method is conducted at high temperature, a chemical reaction will presumably take place on the sorbent, possibly cleaving the halogenated compound. However no desorption is observed even at high temperature.

Both the unloaded sorbent and the sorbent loaded with the disposed-of halogenated compound are water-insoluble and hydrolytically stable. The latter is of great practical importance since the loaded sorbent can thus be deposited in dumps, for example in underground beds.

The inventive method can thus be performed with a reactor of any size that normally only needs to be heatable. It can thus also readily be conducted discontinuously and locally, e.g. in municipal waste disposal.

The inventive method is intended primarily for disposing of halogenated hydrocarbons. It is in particular suitable for disposing of fluorocarbons (FCs), chlorocarbons (CCs), chlorofluorohydrocarbons (CFCs), bromofluorohydrocarbons, bromochlorofluorohydrocarbons and partly halogenated fluorocarbons and chlorofluorohydrocarbons which have 1 to 4 carbons, in particular trichlorofluoromethane, dichlorodifluoromethane, bromochlorodifluoromethane, dibromodifluoromethane, chlorotrifluoromethane, bromotrifluoromethane, tetrafluoromethane, dichlorofluoromethane, chlorodifluoromethane, trifluoromethane (fluoroform), difluoromethane (methylene fluoride), 1,1,2,2-tetrachlorodifluoroethane, 1,1,2-trichlorotrifluoroethane, 1,2-dichlorotetrafluoroethane, 1,2-dibromotetrafluoroethane, chloropentafluoroethane, hexafluoroethane, 1,2-dibromo-1,1-difluoroethane, 2-chloro-1,1,1-trifluoroethane, 1-chloro-1,1-difluoroethane, 1,1,1-trifluoroethane, 1,1-difluoroethane, octafluoropropane, octafluorocyclobutane, decafluorobutane, 1,1-dichlorodifluoroethylene, chlorotrifluoroethylene (trifluorovinylchloride), 1-chloro-2,2-difluoroethylene, 1,1-difluoroethylene (vinylidene fluoride).

However the inventive method is not only suitable for disposing of CFCs, FCS and CCs but applicable in general for halocarbons, e.g. also for halons such as halon 1211, 1301 or 2402, carbon tetrachloride, methyl chloroform or partly halogenated halons. Furthermore it can be used to dispose of $NF_3$ and $SF_6$.

The following examples will serve to explain the invention further.

EXAMPLE 1

A clay mineral of the following composition (% by weight) is used:

| | |
|---|---|
| $Fe_2O_3$ | 53.42% |
| $SiO_2$ | 22.85% |
| CaO | 8.07% |
| MnO | 6.24% |
| $SO_3$ | 6.03% |
| MgO | 1.26% |
| $Al_2O_3$ | 0.77% |
| and traces of $Na_2O$, $TiO_2$, ZnO, $P_2O_5$, $V_2O_5$, $K_2O$, CoO, SrO, $As_2O_3$, B, Li | | and with the following phases:
montmorillonite
goethite
ferrihydrite
and traces of hematite and maghemite.

The water content of the clay mineral is 14% by weight, the solubility in water 4.23% by weight, the specific surface (BET) 162.6 $m^2/g$. The pH value in a 10% aqueous solution is 7.65.

A solid-bed microreactor is filled with this clay material. The microreactor is fed with chloropentafluoroethane ($C_2ClF_5$) which is designated R115 according to DIN 8262. The carrier gas used is nitrogen. The concentration of R115 is 1000 vpm (1000 parts by volume of R115 per 1 million parts by volume of gas). The space velocity is 708 $h^{-1}$. The temperature of the reactor is increased from room temperature to 350° C. The total mass flow is 54.05 sccm (standard ccm). The gas composition of the effluents emerging from the reactor is determined with a mass spectrometer.

In the FIGURE, y-axis represents the relative intensity, i.e. the concentration of the fragments measured with the mass spectrometer, the x-axis the molecular weight of the fragments, and the z-axis the temperature of the reactor.

Chloropentafluoroethane (mass 154/156) breaks down in the mass spectrometer mainly into pentafluoroethane ($C_2F_5$) with mass 119. The 119 peak in the diagram thus shows the adsorption of R115 in the microreactor. It is apparent that the adsorption of R115 in the microreactor already starts at 100° C. and is quantitative at 300° C.

Adsorption takes place quantitatively until the load capacity of the sorbent is reached. During adsorption—even after saturation of the sorbent—no fragments or reaction products of R115 with the sorbent arise; at least none that are not bound irreversibly by the sorbent.

When the temperature is increased within the tested temperature range to 350° C. no R115 is desorbed, or fragments thereof or other aggressive or harmful gases.

EXAMPLE 2

A solid-bed microreactor is filled with a commercially available acid-activated bentonite containing a small amount of iron oxide. The microreactor is fed with tetrafluoromethane ($CF_4$) which is designated R14 according to the DIN notation. The carrier gas used is nitrogen. The $CF_4$ concentration is 3.7% by volume.

At a temperature of 290° to 350° C. a quantitative adsorption of $CF_4$ is detected until the load capacity is reached.

We claim:

1. A method for disposing of ozone-degrading and climatically active fluorine-containing halogenated compounds selected from the group consisting of fluorocarbons, chlorofluorohydrocarbons, bromofluorohydrocarbons, bromochlorofluorohydrocarbons, partially halogenated fluorocarbons having from 1 to 4 carbon atoms and partially halogenated chlorofluorohydrocarbons having from 1 to 4 carbon atoms, comprising the steps of passing the halogenated compounds in the form of vapor in an inert carrier gas through a solid sorbent heated to at least 100° C. and containing a phyllosilicate and at least one member selected from the group consisting of an iron oxide, iron oxyhydroxide, iron hydroxy salt and iron oxyhydroxy salt and binding the halogenated compounds and any decomposition products and reaction products, other than water, in the sorbent, so that only water may be emitted from the sorbent.

2. The method of claim 1, wherein the iron oxyhydroxide is goethite and the iron oxide maghemite, magnetite, ferrihydrite or hematite.

3. The method of claim 1, wherein the iron in the iron oxide and iron oxyhydroxide is partly replaced by a metal selected from the group consisting of metals of group IIIa, IIb, IVb, VIIb, and VIIIb of the periodic table and mixtures thereof.

4. The method of claim 1, wherein the sorbent contains a phyllosilicate in a proportion of at least 10% by weight.

5. The method of claim 4, wherein the phyllosilicate is a mineral selected from the group consisting of the Montmorin group, talc and a mineral from the mica group.

6. The method of claim 4, wherein the sorbent further contains up to 30% by weight of a compound selected from the group consisting of a sulfate of a metal selected from the group consisting of group Ia, IIa and IIIa of the periodic table, a carbonate of a metal selected from the group consisting of group Ia, IIa and IIIa of the periodic table, a tertiary ammonium salt and mixtures thereof.

7. The method of claim 1, wherein the sorbent further contains up to 30% by weight of a compound selected from the group consisting of a sulfate of a metal selected from the group consisting of group Ia, IIa and IIIa of the periodic table, a carbonate of a metal selected from the group consisting of group Ia, IIa and IIIa of the periodic table, a tertiary ammonium salt and mixtures thereof.

8. The method of claim 1, wherein the solid sorbent is heated to a temperature of at least 200° C.

9. The method of claim 1, wherein the solid sorbent contains the oxyhydroxide goethite in combination with at least one iron oxide selected from the group consisting of maghemite, magnetite, ferrihydrite and hematite.

* * * * *